United States Patent
Scalise

[15] 3,683,296
[45] Aug. 8, 1972

[54] HIGH EFFICIENCY LASER CAVITY

[72] Inventor: Stanley J. Scalise, Dallas, Tex.

[73] Assignee: Texas Instruments Incorporated, Dallas, Tex.

[22] Filed: Oct. 13, 1970

[21] Appl. No.: 80,423

[52] U.S. Cl. ................................ 331/94.5, 330/4.3
[51] Int. Cl. ............................................. H01s 3/02
[58] Field of Search ................ 331/94.5; 330/4.3

[56] References Cited

UNITED STATES PATENTS

| | | | |
|---|---|---|---|
| 3,339,150 | 8/1967 | Bowness | 331/94.5 |
| 3,413,567 | 11/1968 | Hannwacker et al. | 331/94.5 |
| 3,423,692 | 1/1969 | Young | 331/94.5 |
| 3,222,615 | 12/1965 | Holly | 331/94.5 |
| 3,102,920 | 9/1963 | Sirons | 331/94.5 |
| 3,219,585 | 11/1965 | Kaiser | 331/94.5 |
| 3,230,474 | 1/1966 | Keck et al. | 331/94.5 |

*Primary Examiner*—William L. Sikes
*Attorney*—Harold Levine, James O. Dixon, Andrew M. Hassell, Melvin Sharp and Rene' E. Grossman

[57] ABSTRACT

A plurality of structural members form a laser cavity structure which has an inner cylindrical surface in which grooves have been formed for mounting light emitters. Other portions of the inner surface of the cavity are coated with a highly light reflective layer. Selected portions of the cavity wall contact the laser rod assembly which is positioned within the cavity and can be used as a heat sink for both the light emitter arrays and the laser rod assembly. Additional cooling for tubular laser rods is provided by a rod-like heat sink mounted concentric with the tubular rod.

7 Claims, 8 Drawing Figures

HIGH EFFICIENCY LASER CAVITY

This invention relates to lasers and more particularly to solid-state lasers including laser cavity structures incorporating heat sinks.

At the present time a number of different lasers are known and in use. These include crystalline lasers, liquid lasers, glass lasers, gas lasers, and semiconductor or solid-state lasers. Laser cavity structures incorporating heat sinks, which are the subject of this invention, are particularly useful with crystalline lasers and other laser materials which can be formed into laser rods.

Many crystalline laser materials have relatively low coefficients of absorption and the light output of solid-state light emitting diode arrays, which are the preferred light sources for use with solid-state laser rods, is relatively low. Considering these factors, solid-state lasers must be highly efficient if a reasonable amount of output power is to be obtained. Significant factors effecting the efficiency of solid-state lasers are the operating temperature of the laser rod and the effective coupling coefficient of the light source to the laser rod.

The primary factors determining the temperature of the laser rod are the power output of the light source, the ratio of absorbed to radiated power, the optical coupling coefficient between the light source and the laser rod, and the means used to cool the rod. Choosing a laser material essentially determines the ratio of absorbed to radiated power, this function being an inherent characteristic of the laser material. The coupling coefficient is a function of the light source, the laser cavity structure and the material used for the laser rod. In most cases the choice of material for the laser rod is limited to relatively few materials by the desired output spectrum. Light sources having a relatively high output and high optical coupling coefficients between the light source and the laser rod are preferable even though these tend to increase the temperature of the laser rod. This essentially limits the control of the laser rod temperature to the use of heat sinks or some other means for removing heat from the laser rod.

The primary factors determining the optical coupling coefficient between the light source and the laser rod are: the material used in the rod, the spectrum of the light source, and the design of the cavity in which the laser is mounted. Considerations other than coupling coefficient may determine the light source and the laser material to be used.

Considering the above discussed factors, improved heat sinks to more effectively cool the laser rod and improved cavity structure to increase the coupling coefficient between the light source and the laser material offer the most flexibility in improving the efficiency of solid-state lasers.

One embodiment of the invention provides a laser sections, structure comprising a plurality of section, the sections being designed such that when assembled they form a laser cavity which is substantially cylindrical in shape with one or more grooves in the inner walls of the cavity for mounting light sources. A laser rod assembly is mounted in the cavity and the interior surfaces of the cavity which are exposed to light are coated with a highly light reflective layer such that any light which passes through the laser rod assembly unabsorbed will be reflected through the rod assembly in a multi-path pattern. The laser rod may be surrounded by a cladding which is transparent to the light emitted by the light source with the outer dimensions of the cladding substantially conforming to the inner dimensions of the cavity. Alternatively, the outer dimensions of the laser rod can be such that they substantially conform to the inner dimensions of the cavity. In either case the cavity can be used as a heat sink for the rod, the cladding if used, and the light sources. The effective coupling coefficient between the light source and the laser rod is increased by the multi-path reflective characteristics of the interior surfaces of the cavity.

In accordance with another embodiment of the invention, a laser cavity structure for grooved laser rods is provided. This embodiment assures that substantially all the light emitted by a diode array light source will pass through some portion of the laser rod before it impinges on any portion of the interior of the laser cavity structure. This is achieved by providing mounting surfaces on the inner wall of the cavity structure for the light emitting diode arrays such that the light emitting surfaces of the diodes extend into grooves in the laser rod.

In accordance with another embodiment, a heat sink is provided for a tubular laser rod assembly. The laser rod assembly may be mounted in the cavity structure discussed above. Additional cooling of the tubular laser rod is provided by a second heat sink. The second heat sink has a rod-like portion which is mounted concentric with the tubular laser rod. One end of the rod-like portion is secured to a base portion. Heat is transferred by conduction from the laser rod to the rod-like portion and along the rod-like portion to the base. The base portion may be attached to an additional heat dissipating structure to further augment cooling. Alternatively, the rod-like portion may consist of concentrically mounted tubes with an opening between the tubes thereby permitting a coolant to be circulating through the rod-like portion.

In each of the above discussed embodiments a laser cavity structure is provided in which a laser rod assembly can be mounted. The cavity structure may serve as a support and a heat sink for the laser rod assembly. The laser rod assembly can be a simple laser rod or it may include other parts, a laser rod cladding for example.

FIG. 3 is an isometric view of a grooved laser rod assembly and one section of a cavity structure for use with this rod assembly.

Figure 1:
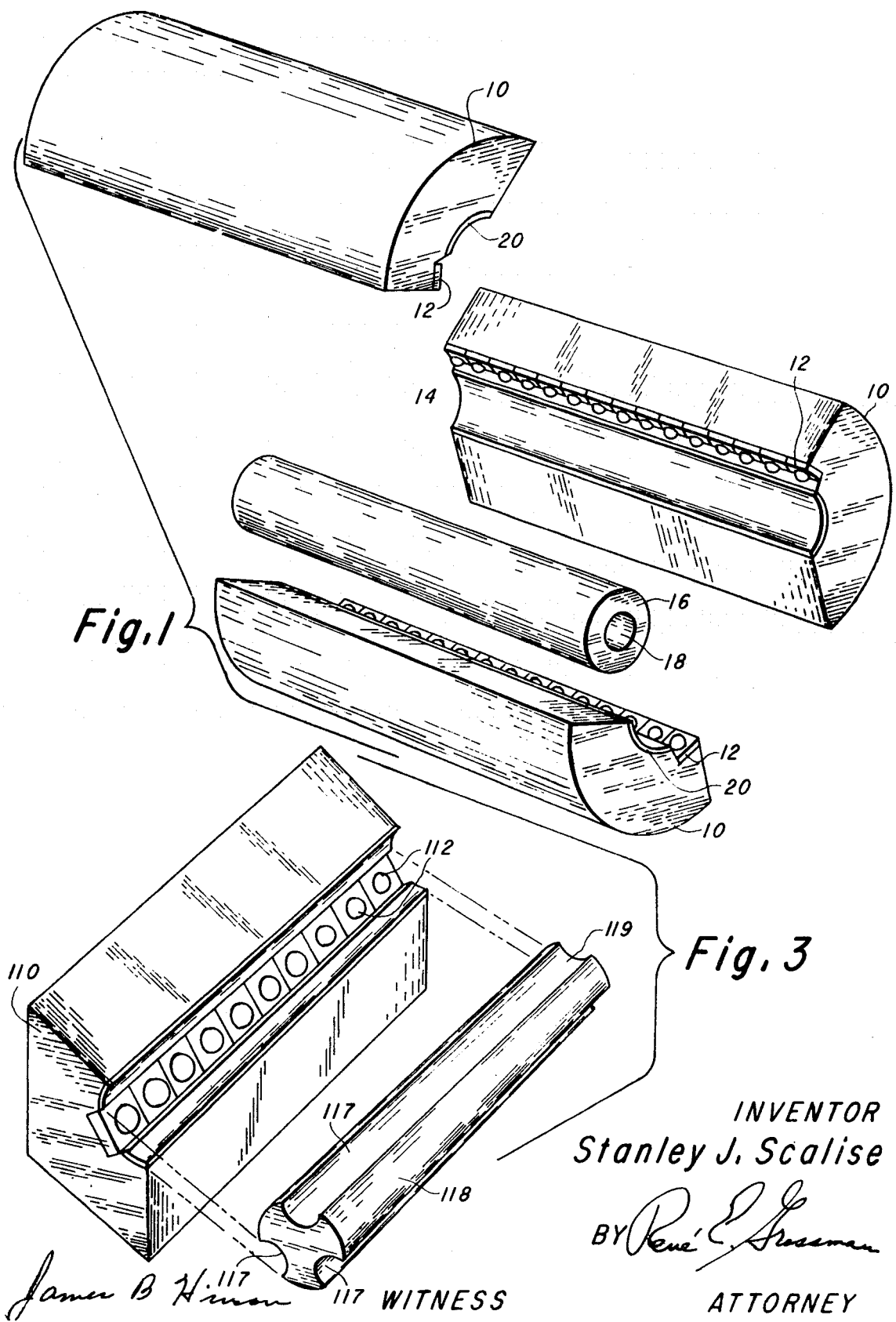
FIG. 1 is an exploded view of a laser cavity structure including a laser rod assembly and light emitting diode arrays.

Referring to the drawings and particularly to FIG. 1, a laser cavity structure according to this invention is shown. The cavity structure consists of three identical sections 10 which when assembled form a substantially cylindrical cavity having grooves 12 in which light emitters 14 are mounted. Positioned within the cavity is a laser rod assembly consisting of a laser rod cladding 16 mounted concentrically with a laser rod 18. The light emitters 14 are a plurality of light emitting diodes mounted in grooves in the inner wall of the cavity with the diodes being oriented such that the emitted light passes into the cladding and tends to be focused by the cylindrical surfaces of the cladding 16 toward the center of the laser rod 18. This focusing of the emitted light toward the center of the rod 18 tends to cause the laser output to be concentrated near the longitudinal axis of the rod thereby increasing the overall efficiency of the laser. The inner cylindrical walls of the cavity are coated with a highly light reflective layer 20 such that any light passing through the rod and cladding unabsorbed and striking these surfaces tends to be reflected back into the rod 18 along a multi-pass path. This multiple path geometry of the cavity in conjunction with the focusing effect of the cladding tends to greatly increase the coupling between the light emitters 14 and the laser rod 18. The assembled cavity is shown in cross section in FIG. 2. Suitable means (not shown) must be provided for holding the cavity together and for supplying power to the diodes. The cavity may be held together by screws, for example, while power may be supplied to the diodes by leads passing through openings in the cavity sections 10.

FIG. 3 illustrates one section 110 of a laser cavity structure which minimizes the amount of light striking the interior walls of the cavity prior to passing through the laser rod assembly 118. In this embodiment the laser rod assembly 118 has one or more grooves 117 formed along its longitudinal surface 119 with the light emitters 112 being mounted on the cavity section 110 such that when the cavity is assembled, the light emitting surfaces of the diodes extend into these grooves 117 thereby assuring that substantially all of the emitted light will pass through at least a portion of the laser rod assembly 118 before it impinges on any portion of the cavity wall. This is particularly advantageous because decreasing the amount of light which impinges on the cavity walls before it passes through the laser rod assembly 118 increases the optical coupling coefficient between the light emitters 112 and the laser rod assembly 118. As with the above discussed embodiment, the outer surfaces of the laser rod assembly 118, with the exception of the grooves, contact the inner surface of the cavity structure thereby assuring good thermal contact between the rod 118 and the cavity structure. The assembled cavity structure including a laser rod assembly is shown in cross section in FIG. 4. Suitable means (not shown) must be provided for supplying power to the diodes and for holding the sections 110 together. The cavity may be held together by screws, for example, while power may be provided to the diodes by leads passing through openings in the cavity sections 110.

The cavity structure illustrated in FIGS. 1 and 3 serve as a supporting structure and as a heat sink for both the light source and the laser rod assembly. To increase the efficiency of the cavity structure as a heat sink, the structural members should have large areas in direct contact with the light emitters and the laser rod assembly or some alternate technique should be used to assure a low thermal resistance is maintained between the light emitter, the laser rod assembly and the cavity structure. A useful technique for lowering the thermal resistance between the laser rod assembly and the cavity structure is to coat the laser rod assembly with glycerol [$C_3H_5(OH)_3$]. Sufficient glycerol should be used to assure no voids are left in areas where the laser rod assembly may not be in direct contact with the inner wall of the laser cavity structure.

Figure 5:
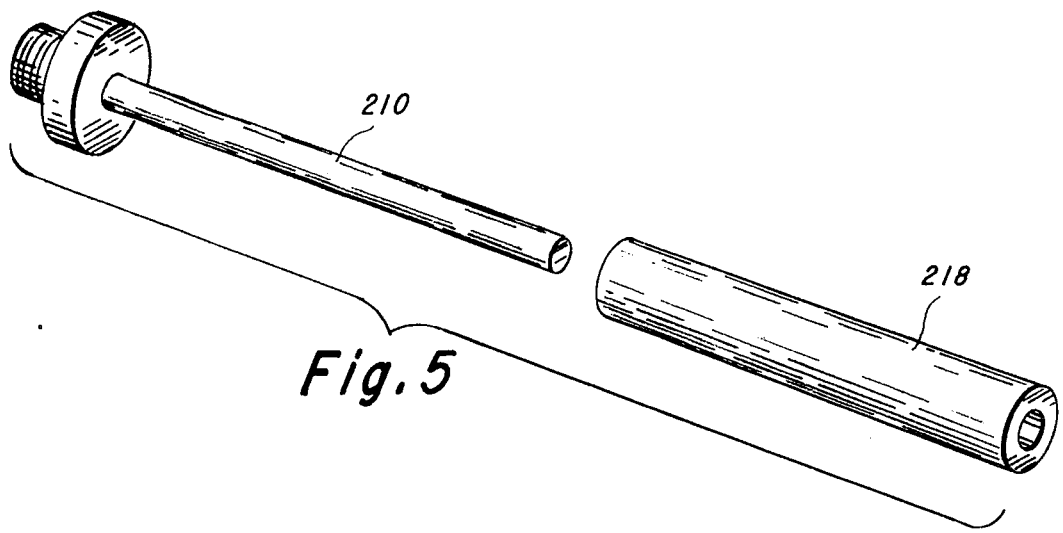
FIG. 5 is an exploded view of a tubular laser rod assembly including a heat sink.
Figure 6:
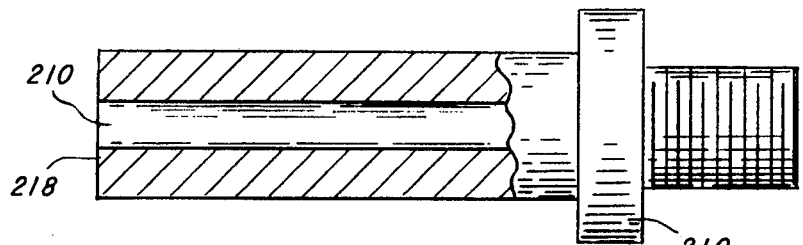
FIG. 6 is an assembled tubular laser rod assembly with portions shown in cross section.

FIG. 5 illustrates a laser rod assembly consisting of a laser rod 218 and a heat sink 210. The laser rod 218 is provided with a bore through its center thereby permitting the laser rod 218 to be positioned concentrically with the heat sink 210. The outer dimension of the heat sink 210 is substantially the same as the inner dimension of the laser rod 218. One end of the heat sink 210 preferably includes a base and a mounting stud as shown in FIG. 6. Heat is transferred from the laser rod 218 to the heat sink 210 by conduction. Cooling can be further augmented by attaching the heat sink 210 to a base (not shown) which serves to further increase the heat dissipation surface. Liquid or gaseous coolants may be used to further increase the heat dissipation ratio of the base.

Figure 7:
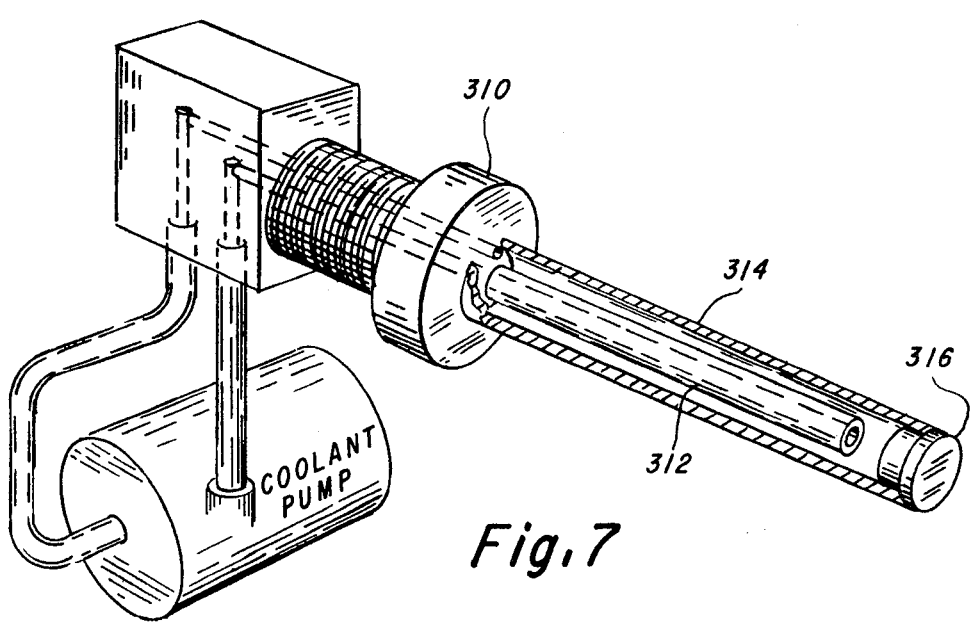
FIG. 7 is an isometric view of a heat sink for tubular laser rods consisting of two concentrically mounted tubes through which a coolant is circulated.

Another embodiment of a heat sink for use with a tubular laser rod is illustrated in FIG. 7. In this embodiment the heat sink 310 includes a rod-like member which consists of two concentrically mounted tubes 312 and 314. The inner tube is slightly shorter than the outer tube with the outer tube being closed at one end as shown generally at reference numeral 316. Heat is transferred from the laser rod to outer tube 314 by conduction with the outer tube being cooled by a coolant flowing through the outer tube 314 and returning through the inner tube 312.

The performance of the above discussed heat sinks and the tubular laser rod can be further improved by coating the external surfaces of the heat sink and the rod-like portion of the heat sink with a highly light reflecting layer and the inner surface of the tubular laser rod with glycerol before the laser rod is placed on the heat sink. The primary purpose of the light reflecting layer is to reduce light absorption by these surfaces. The primary purpose of the glycerol is to improve the thermal contact between the laser rod and the heat sink thereby increasing the rate at which heat can be transferred from the rod to the heat sink by conduction. The performance of the laser illustrated in FIG. 1 can also be improved by coating the laser rod 18 with glycerol before it is placed in the cladding 16 for similar reasons.

Figure 8:
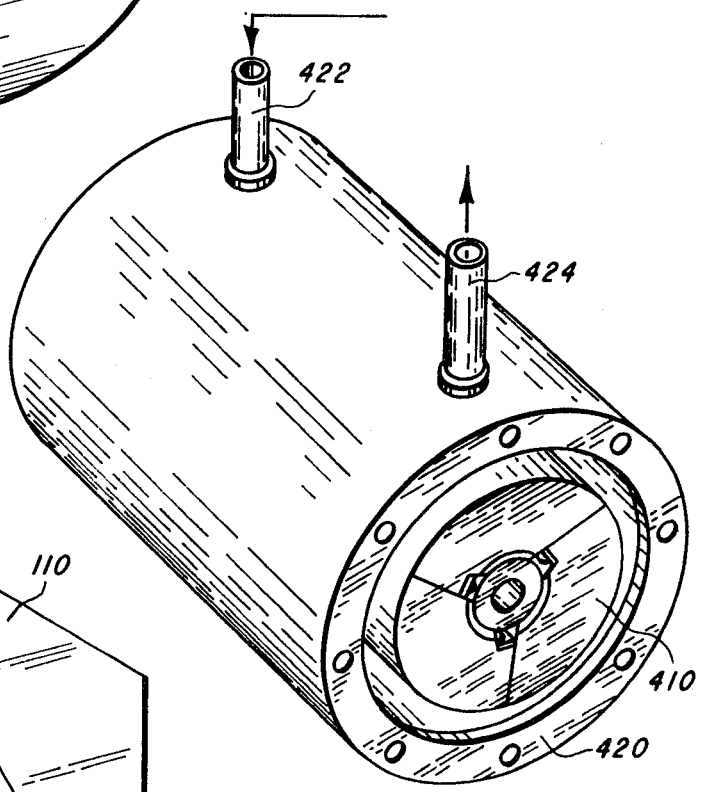
FIG. 8 is an isometric view of an assembled laser cavity structure including cooling jacket through which a liquid or gaseous coolant may be circulated.

Illustrated in FIG. 8 is a cylindrical laser cavity structure 410 and a cooling jacket 420 mounted concentrically therewith. Space is provided between laser cavity structure 410 and the cooling jacket 420 such that the coolant is in direct contact with substantial portions of the outside of the laser cavity structure. Two openings 422 and 424, one near each end of the cooling jacket 420 are provided. Coolant is provided by an external pump (not shown) with the coolant entering at the first opening 422 and being discharged through a second opening 424.

Figure 2:
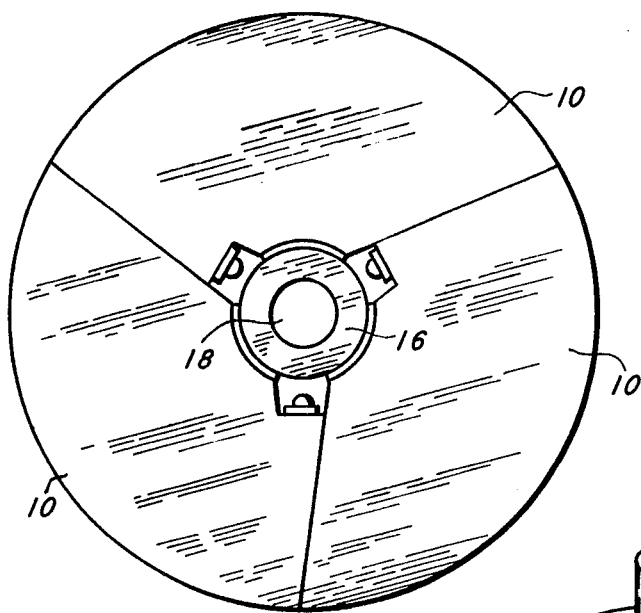
FIG. 2 is a cross section view of the assembled laser cavity structure of FIG. 1.
Figure 4:
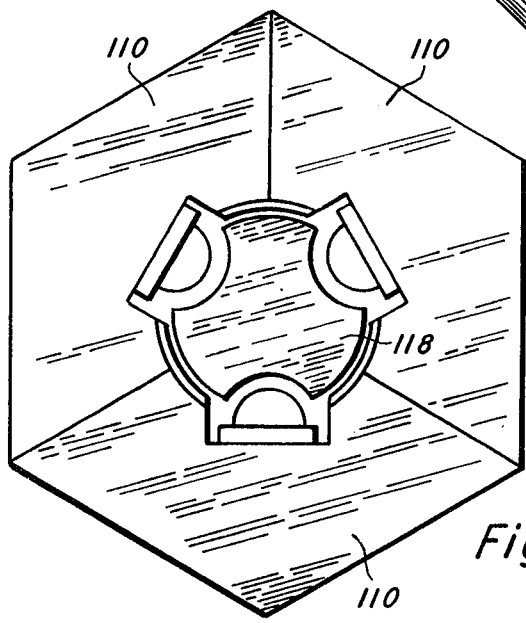
FIG. 4 is a cross section view of the laser cavity structure illustrated in FIG. 3.

The sections forming the cavity structures illustrated in FIGS. 2 and 4 may be made of copper, aluminum, or other materials which have good heat transfer properties and sufficient rigidity to properly support the laser rod assembly. The light emitters are preferably semiconductor light emitting diodes with the exact diodes used depending somewhat on the laser material used in that the spectrum of the emitted light should reasonably match the absorption spectrum of the laser material. Additionally the temperature at which the light emitters will be operated must be considered as this can effect the spectrum of the emitted radiation. The choice of the laser material will depend primarily on the desired spectrum for the emitted radiation. Neodymium doped yttrium aluminum garnet, commonly referred to as YAG has been found useful for lasers emitting radiation in the neighborhood of 10,600 A. Diodes useful with the YAG rods include gallium arsenide phosphide, gallium phosphide, gallium aluminum arsenide and gallium arsenide. Liquid nitrogen has been found to be a suitable coolant for use with the cooling jacket illustrated in FIG. 8 or with the heat sink illustrated in FIG. 7. The light reflective layer for the inner surface of the cavity structure and exposed portions of the heat sink may be vacuum deposited silver. Gold may also be used.

Although the invention has been disclosed and defined with reference to preferred embodiments, it will be obvious to those skilled in the art herein encompassed that many modifications are possible within the ordinary skill of such artisans without departing from the scope of the invention as herein disclosed and described.

WHAT IS CLAIMED IS:

1. A laser rod assembly comprising a tubular laser rod having cylindrical inner and outer surfaces and a heat sink, said heat sink having a rod-like surface concentrically positioned with respect to and in low thermal resistance contact with said inner cylindrical surface of said laser rod and a base portion, said base portion including means for securing said base portion to a mounting structure such that heat is readily transferred by conduction from said base portion to said mounting structure.

2. A laser rod assembly including a tubular laser rod and a heat sink, said heat sink comprising first and second concentrically positioned tubular portions, said second tubular portion having an outer radius less than the inner radius of said first tubular portion, said first tubular portion being positioned concentrically with respect to said laser rod, the outer surface of said first tubular portion being in low thermal resistance contact with the inner surface of said tubular laser rod, and means for circulating a coolant through said first and second tubular portions thereby cooling said laser rod.

3. A laser structure comprising, a cylindrical laser rod assembly having at least one groove along its outer surface, at least one member having an inner surface shaped to substantially conform to the non-grooved portion of the outer surface of said laser rod assembly, said inner surface being in contact with and supporting said laser rod assembly, said one member having a groove for mounting a light source such that the light emitting surface of said light source will be positioned within said groove in said laser rod assembly, and an array of solid state light emitters mounted in said groove.

4. A laser structure in accordance with claim 3 wherein the inner surface of said at least one member is light reflecting.

5. A laser structure in accordance with claim 3 wherein said at least one member is in low thermal resistance contact with said laser rod assembly and serves as a heat sink for cooling said laser rod assembly.

6. A laser structure in accordance with claim 3 wherein said laser rod assembly includes a laser rod and a cladding mounted concentric with said laser rod.

7. A laser structure in accordance with claim 3 wherein said solid state light emitters are an array of semiconductor light emitting diodes.

* * * * *